United States Patent

Kraus et al.

[11] Patent Number: 5,380,248
[45] Date of Patent: Jan. 10, 1995

[54] TORSIONAL SHOCK ABSORBER

[75] Inventors: Georg Kraus, Bergrheinfeld; Bernhard Schierling, Kürnach, both of Germany

[73] Assignee: Fichtel & Sachs AG, Schweinfurt, Germany

[21] Appl. No.: 994,547

[22] Filed: Dec. 21, 1992

[30] Foreign Application Priority Data

Dec. 20, 1991 [DE] Germany ............... 4141723

[51] Int. Cl.⁶ .................................. F16D 3/14
[52] U.S. Cl. .......................... 464/66; 464/68
[58] Field of Search ............... 464/66, 68; 192/106.2

[56] References Cited

U.S. PATENT DOCUMENTS

| 4,433,770 | 2/1984 | Loizeau et al. | 464/68 X |
| 4,690,660 | 9/1987 | Hashimoto | 464/66 |
| 4,729,465 | 3/1988 | Reik | 464/68 |
| 4,747,801 | 5/1988 | Chasseguet et al. | 464/66 |
| 4,959,039 | 9/1990 | Naudin | 446/66 |
| 5,052,244 | 10/1991 | Kaniya et al. | 464/66 X |
| 5,065,642 | 11/1991 | Kagiyama et al. | |
| 5,249,659 | 10/1993 | Fukushima | 192/106.2 X |

FOREIGN PATENT DOCUMENTS

| 2387384 | 11/1978 | France . |
| 2593252 | 7/1987 | France . |
| 2641048 | 6/1990 | France . |
| 3901571 | 8/1990 | Germany . |
| 1602408 | 11/1981 | United Kingdom . |
| 2159241 | 11/1985 | United Kingdom . |

Primary Examiner—Lenard A. Footland
Assistant Examiner—Eileen A. Dunn
Attorney, Agent, or Firm—Brumbaugh, Graves, Donohue & Raymond

[57] ABSTRACT

The torsional shock absorber which is preferably suitable for a dual-mass flywheel comprises an input part (1) and an output part (21) which is rotatable round a common axis of rotation. Between control edges (43) of the input part (1) and control edges (41) of the output part (21), long load springs (23) designed for load running are arranged in an annular channel (15) which surrounds the axis of rotation and couples the output part (21) torsionally elastically to the input part (1). The output part (21) or optionally spring pots (25) provided at the face ends of the load springs (23) carry a peripherally resilient intermediate element (45) which projects beyond the control edges (41) of the part guiding the intermediate element (45) and rests on the control edges (35) of the other part. The control edges of these two parts are spaced from one another in the rest position of the torsional shock absorber, this spacing forming the operating range of the idling suspension. The idling suspension is bridged over once the spacing is used up.

15 Claims, 5 Drawing Sheets

TORSIONAL SHOCK ABSORBER

BACKGROUND OF THE INVENTION

The invention relates to a torsional shock absorber for arrangement in a driving train of a motor vehicle, for example in a clutch plate of a friction clutch and in particular in a dual-mass flywheel.

A torsional shock absorber of a dual-mass flywheel is known from DE-A-39 01 571, which has two radially superimposed sets of springs which are connected in series between an input part and an output part which is rotatable relative thereto round a common axis of rotation. The springs of the radially outer set, which are either very long single-part springs or a plurality of shorter springs connected in series, are arranged in an annular channel of the input part concentrically surrounding the axis of rotation and couple the output part torsionally elastically to the input part in a load running range. Spring arrangements of this type allow a large relative angle of rotation between output part and input part in a relatively small space. The springs of the two radially superimposed sets of springs may be designed for different spring characteristics so that staged spring characteristics may also be achieved. In many applications, in particular in the case of dual-mass flywheels, however, the space radially within the space occupied by the springs of the wide angle suspension is however required for other components of the torsional shock absorber or the parts connected thereto.

SUMMARY OF THE INVENTION

It is an object of the invention to provide a torsional shock absorber of the foregoing type with absorber parts which are capable of rotating relative to one another over a comparatively great relative angle of rotation and in which the idling suspension may be arranged more desirably than hitherto and, in particular, requires substantially no space radially within the region of the wide angle load suspension.

The invention is based on a torsional shock absorber for arrangement in a driving train of a motor vehicle which comprises:

- two absorber parts which are rotatable together and also relative to one another round a common axis of rotation and have the form of an input part and an output part, of which at least one of the two absorber parts forms a substantially annular channel which is concentric to the axis of rotation,
- a plurality of long spring means which are arranged in the channel, are designed for load running, are resilient in the peripheral direction of the absorber parts, couple the absorber parts elastically to one another and of which each has at least one helical spring between two control ends and
- control edges on the two absorber parts which are arranged adjacently to one another between the control ends of peripherally adjacent spring means and may rest on the control ends.

The improvement according to the invention resides in the fact that at the control ends of the spring means or one of the two absorber parts in the peripheral direction of the absorber parts there are arranged resilient intermediate elements of which the spring constant is designed for idle running and is lower than that of the spring means and which project with a stop edge over the control end of the spring means toward the control edge of one absorber part or over the control edge of one absorber part toward the control end of the spring means such that the intermediate elements torsionally elastically couple the absorber parts but are bridged over when the control ends of the spring means rest on the control edges of one absorber part.

The spring means designed for load running are helical springs of great length or a plurality of shorter springs which are arranged in series over the common mean diameter determined by the channel and couple the absorber parts torsionally elastically to one another via the control edges thereof. The resilient intermediate elements permit idling suspension and have a very flat spring characteristic. The intermediate elements are bridged over by the control edges of the absorber parts striking the control ends of the load springs after their spring travel has been used up. The idling suspension can be arranged very compactly in this way and, furthermore, the friction originating from the load springs and the components controlling the load springs is very low. The lack of friction is due to the fact that the load springs move within the idling spring travel together with one of the absorber parts, in particular the input part, on which they are supported, therefore cannot contribute to the friction. Very effective, compactly arranged idling suspension is produced even if the load springs are arranged only in a single row of springs.

In a preferred embodiment of the invention, the resilient intermediate elements have covering plates which are substantially congruent, are built up in pairs and are arranged on both sides of radial arms arranged, in particular, on the output part. The covering plates are rigidly connected to one another and are held apart and project, in the rest position of the absorber parts, beyond the contour of control edges of the arms by the amount of idling suspension. The spring elements of the idling suspension, preferably designed as helical springs, may thus be arranged compactly and guided reliably.

In a first embodiment, respective substantially congruent apertures may be provided in the two covering plates and the arm arranged therebetween for receiving the idling spring element. Helical springs, in particular, may be guided simply and compactly in this manner.

The guidance of the two covering plates peripherally relative to the radial arm may be carried out exclusively by means of the idling spring elements. Such guidance may be achieved particularly inexpensively. However, it is also possible to guide the two covering plates exactly on the radial arm by means of additional guide elements. Although such guidance is more expensive, it relieves the idling spring elements and can contribute to a reduction in idling friction.

In a particularly desirable embodiment, the two covering plates are mounted pivotally relative to the arm on a pivot axis parallel to the axis of rotation of the absorber parts. The pivotability of the covering plates allows the spring characteristic to be influenced to a certain extent during idle running. A non-linear trend of the spring characteristic can therefore be achieved by suitable shaping of the control edges.

The pivot axis of the two covering plates is preferably arranged on the side of the apertures in the idling spring elements located toward the axis of rotation of the absorber parts and is formed by the shank of a spacer rivet which simultaneously keeps the two covering plates fastened to one another with spacing. The spacer rivet relieves the centrifugal force of the idling spring elements.

In order further to improve the guidance of the two covering plates, an axially bent nose which engages peripherally rigidly in a recess on the other covering plate is preferably provided on the radially externally located side of the apertures in the idling spring elements on one of the covering plates. This non-rotational connection may also be utilised for axial support with low expenditure in that the nose is provided, in the region of its free end, with at least one, preferably two stop edges axially supported on the other covering plate. The two covering plates which are rigidly connected to one another therefore form a cage in which the idling spring elements are received with exact guidance.

It is proposed in a variation that the two covering plates be provided with guide elements which allow movement in the peripheral direction of the absorber parts. For this purpose, longitudinal slots which extend in the form of an arc round the common axis of rotation of the absorber parts and in which the guide elements of the covering plates engage may be arranged in the radial arm radially on either side of the apertures in the idling spring elements. In a particularly simple embodiment, these guide elements are designed as axially bent noses of one of the covering plates which engage in associated orifices in the other covering plate. As already described, the noses may fix the axial spacing between the two covering plates by means of stop edges in the region of their free ends and they may simultaneously ensure axially rigid connection of the two covering plates by caulking of their end regions. Such an embodiment can be produced particularly economically.

In an embodiment with particularly low friction, the guide elements may be designed as rivet studs supporting freely movable rollers. The friction may therefore be reduced substantially to rolling friction values.

According to a further feature of the invention, the spring ends of the load spring means, that is the spring ends of the end springs, are guided in spring pots having substantially the form of a prism on their sides remote from the spring. The control elements of the input part arranged axially on either side of the radial arms of the output part have a complementarily shaped contour and support the load springs under initial tension in the rest position of the absorber parts. The intermediate elements of the idling suspension are substantially free of play relative to the spring pots in the rest position. The initial tension of the load springs ensures that, during the introduction of forces below this pretensioning force, the load springs do not perform a movement relative to the input part and therefore do not participate in the production of friction which is undesirable during idle running. The initial tension of the load springs preferably corresponds substantially to the maximum load acting on the idling spring elements. The load springs do not therefore move relative to the input part within the idling range, and the transition of the spring characteristic from the idling range to the load range takes place substantially smoothly.

The control edges on the radial arms are preferably provided with an opposing contour adapted to the prism shape of the spring pots. Forces to be transferred in the load range can therefore be transferred reliably and without wear to the spring pots.

In particular for an embodiment in which the covering plates are offset in parallel with the axis against the axis of rotation of the absorber parts and mounted on one of the absorber parts it is proposed that the contour of the covering plates be selected such that it may be caused to co-operate merely with the radially outer prism face of the spring pots. In this way, in particular, the spring characteristic of the idling suspension may be influenced despite very low friction. With suitable design of the spring pots and the control edges co-operating with them it is possible to produce a non-linear spring characteristic.

In a further embodiment in which the idling suspension is arranged in the region of the load springs, the resilient intermediate elements are arranged within the spring pots. The idling suspension can therefore be shifted substantially completely into the spring pots and can therefore be assembled and have its operability checked prior to complete assembly of the torsional shock absorber. The intermediate element may be a rotationally symmetrical component which is displaceably guided in an associated orifice in the spring pot. A stop of the intermediate element limits the maximum spring travel in the push-out direction, the intermediate element resting via an associated idling spring element on a spring support which is in turn held in the spring pot by the load spring. The spring support is preferably a separate part so the spring pot may be machined simply and the idling spring element may be supported directly on the end face of the load spring via the spring support.

As proposed in a variation, the intermediate element may be a flat component which is very easy to produce and is guided in a slot in the spring pot. The spring pot is preferably designed as a plastics injection moulding so the slot guiding the intermediate element may easily be produced. A simple transverse pin which penetrates an aperture guiding the idling spring element in the intermediate element may be provided as an axial stop for the intermediate element.

The torsional shock absorber according to the invention is preferably used in a dual-mass flywheel in which the input part is fastened on the crankshaft of an internal combustion engine and forms a first centrifugal mass while the output part serves as a connecting element to a second centrifugal mass. A dual-mass flywheel of this type forms a particularly compact unit as the idling suspension may be integrated into the radially outer region of the two centrifugal masses and the radially inner region may be kept free for other components. A dual-mass flywheel of this type has only very low friction during idle running.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
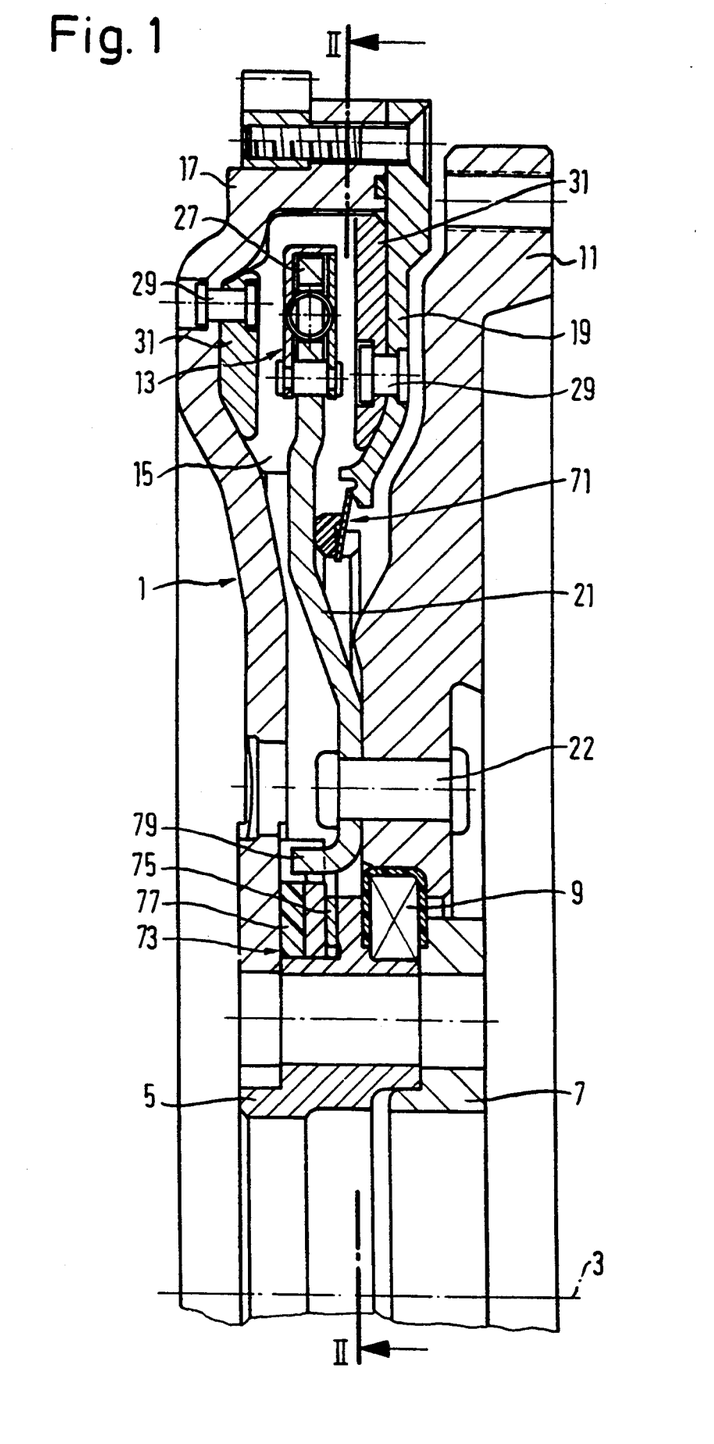
FIG. 1 is a partial axial longitudinal section through a dual-mass flywheel with a torsional shock absorber according to the invention, to be arranged in the driving train of a motor vehicle, viewed along a line I—I in FIG. 2.
Figure 2:
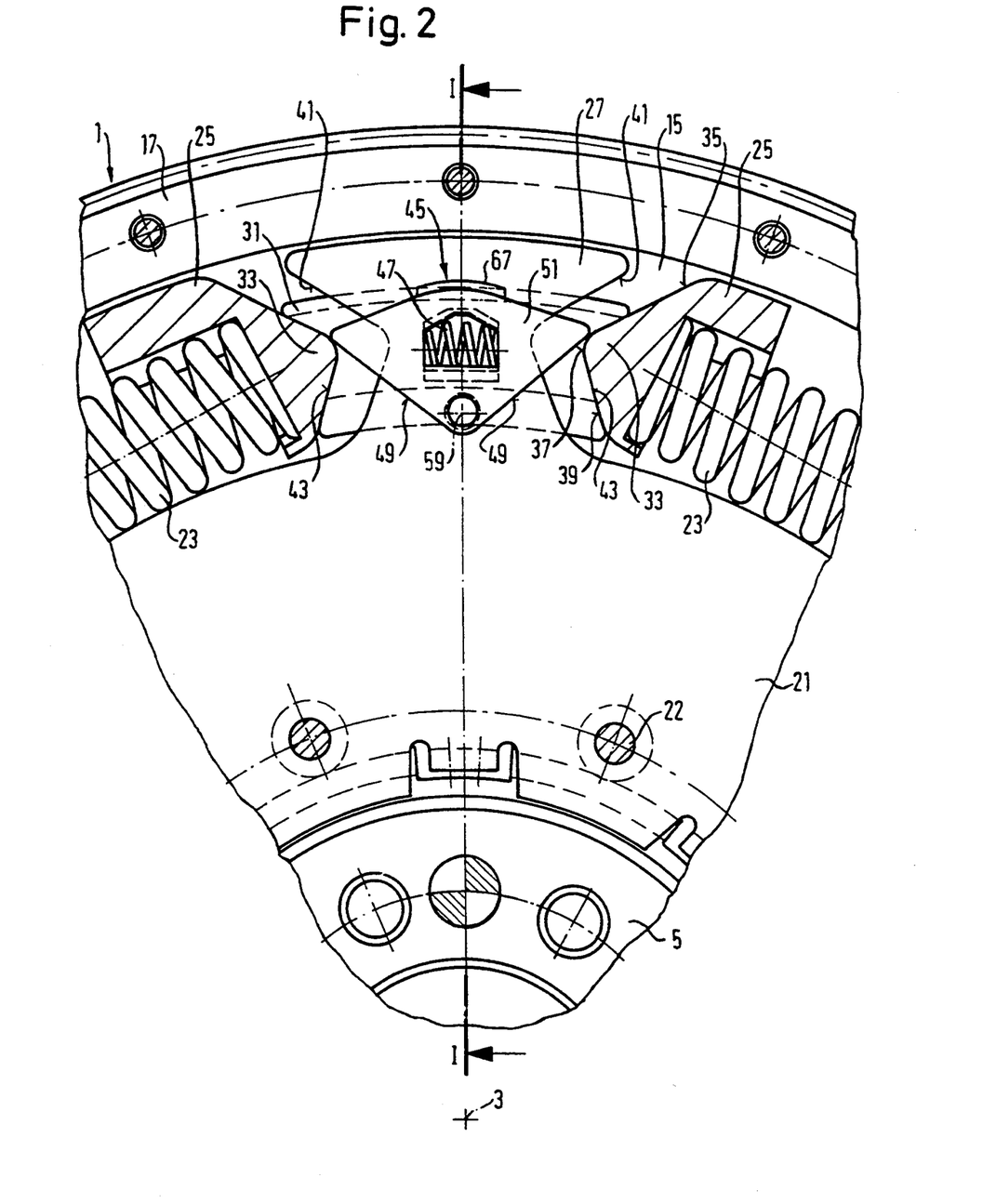
FIG. 2 is a partial sectional view through the dual-mass flywheel, viewed along a line II—II in FIG. 1.

The dual-mass flywheel shown in FIGS. 1 and 2 comprises a first centrifugal mass 1 which may be screwed on a crankshaft (not shown) of an internal combustion engine and of which the axis of rotation common with the crankshaft is indicated at 3. Together with the centrifugal mass 1, a hub 5 may be fixed on the crankshaft, the hub 5 axially fixing a bearing 9 by means of a ring 7 on which bearing a second centrifugal mass 11 is mounted rotatably relative to the first centrifugal mass round the axis of rotation 3 by a limited pivot angle but is axially rigidly mounted relative to the crankshaft. The second centrifugal mass 11 forms a bearing plate for a motor vehicle friction clutch (not shown) in the conventional manner.

The two centrifugal masses 1, 11 are torsionally elastically connected to one another via a torsional shock absorber 13. The torsional shock absorber 13 has, in the radially outer region of its first centrifugal mass 1 forming an input part, a channel 15 which annularly concentrically surrounds the axis of rotation 3 and is axially laterally and radially outwardly limited by a pot-shaped part 17 and an annular disc part 19 fastened thereon in a sealed manner and arranged axially between the pot-shaped part 17 and the substantially disc-shaped second centrifugal mass 11. Between the parts 17, 19 there projects a disc 21 which is also annular, forms an output part of the torsional shock absorber 13 and is fixed in the region of its internal periphery on the second centrifugal mass 11 via rivets 22.

A plurality of very long helical springs 23 designed for load running is arranged radially outside the disc 21 and therefore on a relatively great mean diameter in the channel 15, as shown in FIG. 2. The face ends of the load springs 23 are guided in spring pots 25 in the channel 15, the spring pots 25 coupling the load springs 23 on the one hand to arms 27 of the disc 21 engaging between the spring pots 25 of peripherally adjacent load springs 23 and on the other hand to control elements 31 fixed axially on either side of the arms 27 on the parts 17, 19 of the first centrifugal mass 1 by rivets 29. During a relative rotation of the first centrifugal mass 1 and of the disc 21 round the axis of rotation 3, the load springs 23 are pressure loaded during load running between the arms 27 on the one hand and the control elements 31 on the other hand. For contact and for the introduction of force into the load springs 23, the spring pots 25 have, on their sides peripherally facing away from the load springs 23, the form of a prism 33 with a radially external prism face 35 which passes into a radially internal prism face 39 in a rounding 37. The arms 27 as well as the control elements 31 are provided with control edges 41 and 43 of which the contour mates with the contour of the prism faces 35, 39 directed peripherally away from the load springs 23 and extending toward one another.

The load springs 23 which may be very long single-part springs or also a plurality of short springs arranged in series between peripherally succeeding pairs of arms 27 rest under initial tension and therefore without play between peripherally succeeding control elements 31. The arms 27, on the other hand, are designed such that they allow rotational play of the disc 21 relative to the first centrifugal mass 1 before the control edges 41 of the arms 27 strike the spring pots 25 and load the load springs 23 beyond the initial tension thereof. The rotational play fixes the range of action of an idling suspension system formed by resilient intermediate elements 45. The intermediate elements 45 are supported movably via idling springs 47 on the arms 27 in the region of the arms 27 and similarly have control edges 49 with which they rest without play peripherally on the radially outer prism faces 35 of the spring pots 25.

Figure 3:
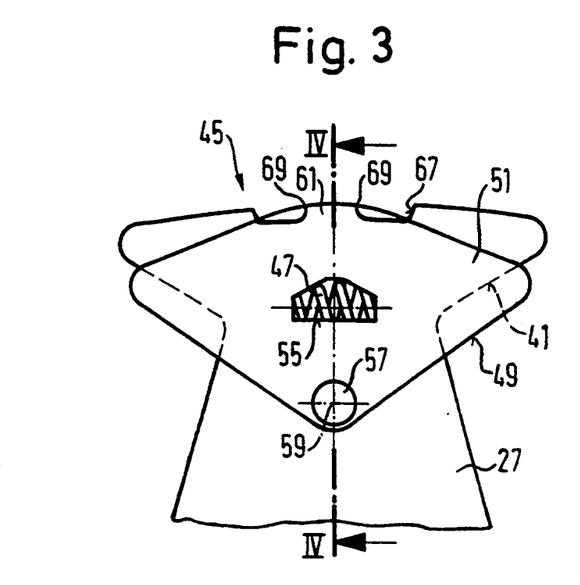
FIG. 3 is a side view of an idling spring arrangement of the torsional shock absorber.
Figure 4:
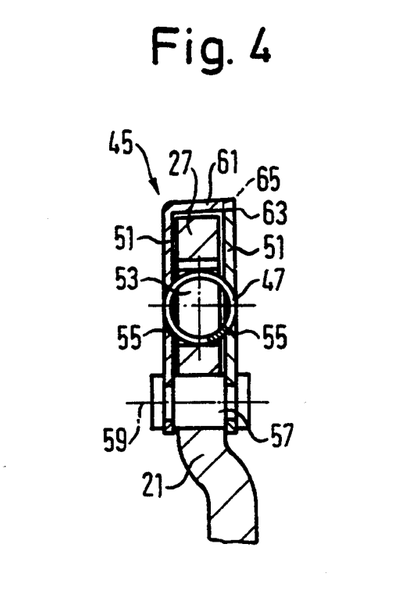
FIG. 4 is a sectional view of the idling spring arrangement, viewed along a line IV—IV in FIG. 3.

As shown in detail in FIGS. 3 and 4, the intermediate element 45 comprises two covering plates 51 which are arranged axially on either side of the arm 27 and hold the idling spring 47 arranged in an aperture 53 of the arm 27 in corresponding apertures 55. The covering plates 51 are mounted pivotally round a pivot axis 59 extending in parallel with and at a distance from the axis of rotation 3, on the side located toward the axis of rotation 3, by a spacer rivet 57. The spacer rivet 57 connects the covering plates 51 to one another with predetermined spacing. On the side radially facing away from the spacer rivet 57, one of the covering plates 51 carries an axially bent nose 61 which engages in a recess 63 in the other covering plate 51 and non-rotatably connects the two covering plates 51 to one another. On either side in the peripheral direction, the nose 61 is provided with axially directed stops which are indicated at 65, rest on the other covering plate 51 and also guarantee axial fixing here. As shown in particular in FIG. 3, the nose 61 may pass through a recess 67 in the arm 27 so that it forms with its peripherally located edges 69, stops for limiting the rotational travel of the covering plates 51. As shown in the variation in FIG. 2, the recess 67 may also be designed as a slot-like orifice in the arm 27.

The load springs 23 are inserted under initial tension between the control elements 31. The initial tension is preferably calculated to be equal to the maximum force of the idling springs 47 adjusted after the idling rotational play has been used up so that the transition of the idling spring characteristic into the load spring characteristic is smooth. It will be appreciated, however, that the initial tension of the load springs 23 may also be greater if a jump in spring force is desired. When a torque is introduced into the dual-mass flywheel, the idling springs 23 form a rigid unit with the centrifugal mass 1 owing to their initial tension during idle running. During rotation of the disc 21 relative to the centrifugal mass 1, the covering plates 51 are pivoted round the pivot axis 59 in the same direction as the centrifugal mass 1 and in the opposite direction to the disc 21, whereby one of the two control edges 49 resting substantially without play on the radially outer prism faces 35 of the spring pots 25 in the rest position of the torsional shock absorber lifts from the associated spring pot 25 while the other spring pot 25 approaches the control edge 41 of the arm. Only the idling springs 47 are stressed until the rotational play between this spring pot and the arm 27 is used up. As soon as the spring pot strikes the control edge 41 with its prism faces 35, 39, the idling spring 47 is bridged over and only the load suspension system of the torsional shock absorber becomes effective. As the load springs 23 are not stressed during idle running, the entire system is only affected by very low friction in the idling range. The friction is determined substantially only by the friction between the spacer rivet 57 and the hole of the arm 27 associated with it, the friction of the control edge 49 on the spring pot 25 and the friction of the bearing 9.

The spring characteristic of the idling suspension may be influenced by suitable shaping of the control edge 49 of the covering plates 51 with respect to the contour of the prism faces 35 as well as the rounding 37 adjacent thereto. In particular, a progressive spring characteristic may be achieved even if the idling spring 47 is to have a linear spring characteristic. In individual cases, the spacer rivet 57 may optionally be dispensed with so that the covering plate 51 is guided exclusively via the idling aperture 47 on the arm 27.

FIG. 1 in particular shows further details of the dual-mass flywheel. Thus, an axially elastic annular seal 71 which seals the channel 15 from the plate 21 and therefore toward the exterior is provided on the internal periphery of the plate 19 serving as a cover. The channel 15 can therefore be at least partially filled with a lubricant which at the same time has a hydraulic damping effect owing to the spring pots 25 acting as displacers. A friction arrangement 73 of which friction element 77 axially pretensioned by a Belleville spring washer 75 is coupled with play corresponding to the idling rotational play but otherwise non-rotatably to projections 79 on the internal periphery of the disc 21 is also arranged on the hub 5. The friction arrangement designed for load running is therefore used only after the rotational angle provided for idle suspension has been covered.

Variations of intermediate elements of the idling suspension, all of which may be used in the aforementioned dual-mass flywheel are described hereinafter. Similarly acting components are provided with the reference numerals from FIGS. 1 to 4 provided with a letter for distinction. Reference is made to the description of FIGS. 1 to 4 for explanation of the construction and mode of operation of the flywheel and the intermediate elements.

Figure 5:
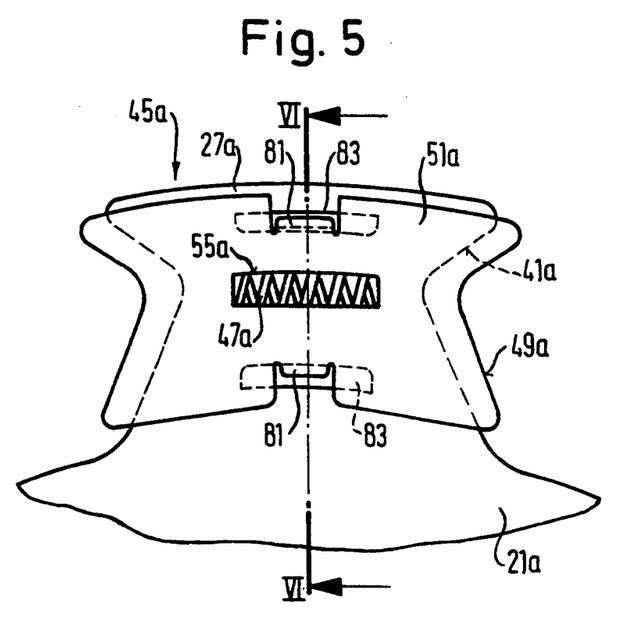
FIG. 5 is a side view of a variation of an idling spring arrangement.
Figure 6:
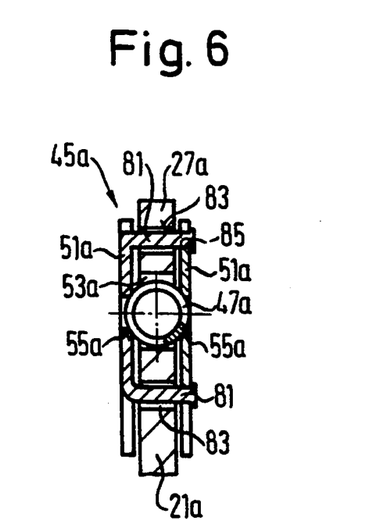
FIG. 6 is a sectional view, viewed along a line VI—VI in FIG. 5.

FIGS. 5 and 6 show an intermediate element 45a of which the covering plates 51a arranged axially on either side of the arms 27a projecting radially from the disc 21a are guided on guide elements in the form of noses 81, which project axially and are bent from one of the two covering plates 51a, substantially over a circle round the axis of rotation 3 in FIG. 1) movably on the disc 21a. The noses 81 pass through arc-shaped slots 83 provided radially on either side of the idling spring 47a in the arm 27a. The idling spring 47a is in turn held in mutually aligned apertures 53a, 55a of the arm 27a or of the covering plates 51a. The noses 81 have shoulders indicated at 85 in the region of their free end, the shoulders determining the axial spacing between the two covering plates 51a, and are caulked or rigidly riveted for reciprocal fixing of the covering plate 51a. The noses therefore have a double role in that they fix the covering plates 51a on one another on the one hand and displaceably guide the covering plates 51a in the peripheral direction of the channel containing the load springs on the other hand. The mode of operation of the intermediate elements 45a corresponds, moreover, to the mode of operation described with reference to FIGS. 1 to 4, the covering plates 51a, however, being provided with control edges 49a which are also adapted to mate with the contour of the prism faces (35, 39 in FIG. 2) of the spring pots and make operational contact with the two prism faces.

Figure 7:
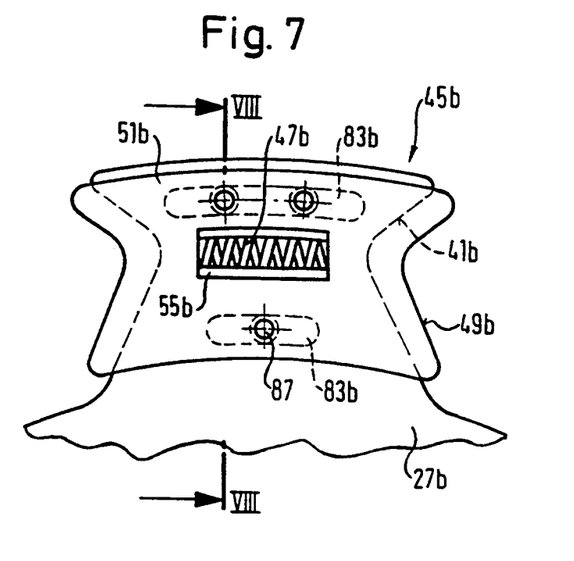
FIG. 7 is a side view of a further variation of an idling spring arrangement.
Figure 8:
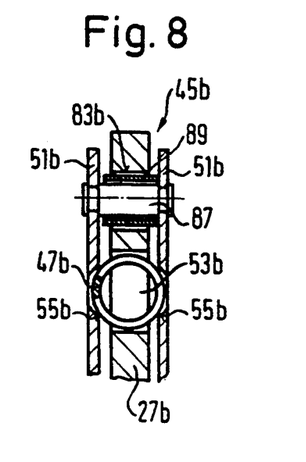
FIG. 8 is a sectional view, viewed along a line VIII—VIII in FIG. 7.

FIGS. 7 and 8 show an intermediate element 45b which differs from the intermediate element in FIGS. 5 and 6 substantially only in that its guide elements connecting and spacing the two covering plates 51b are designed as rivet studs 87 which are riveted to the two covering plates 51b, penetrate slots 83b arranged in the arm 27b with both on radially opposed sides of the idling spring 47b and each carry a roller 89 in the slots 83b. The roller 89 permits rolling friction during the relative movement of the covering plates 51b relative to the arm 27b, and this further reduces the idling friction. The idling spring 47b in turn rests in mutually allocated apertures 53b, 55b of the arm 27b or of the covering plates 51b. The covering plates are also provided with control edges 49b adapted to the spring pots in this case.

Figure 9:
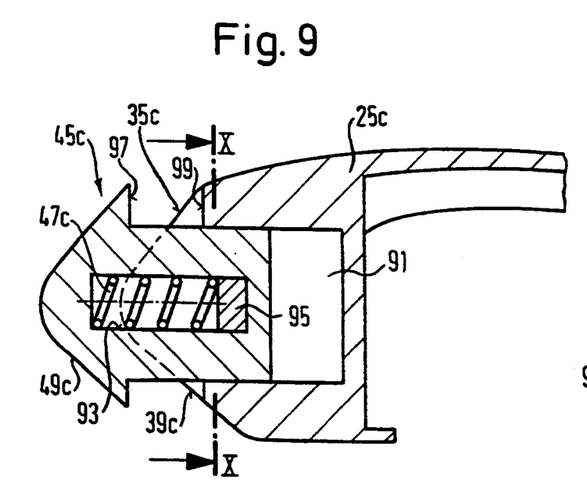
FIG. 9 is a sectional view of an idling spring arrangement integrated into a spring pot.
Figure 10:
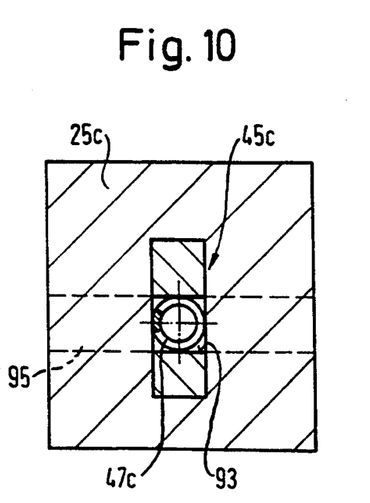
FIG. 10 is a sectional view through the idling spring arrangement, viewed along a line X—X in FIG. 9.

FIGS. 9 and 10 show an intermediate element 45c which, in contrast to the above-described intermediate elements, is not guided on the arms of the disc forming the output part but is integrated in the spring pot 25c. The intermediate element 45c is a flat component which is substantially rectangular in cross section and is peripherally displaceably guided in a substantially peripherally extending rectilinear slot 91 in the guide pot 25c. The intermediate element 45c contains an aperture 93 which is limited in the displacement direction and in which the idling spring 47c is arranged. On the side of the idling spring 47c directed toward the load spring, a transverse pin 95 held in the spring pot 25c on both sides extends between the idling spring 47c through the aperture 93. The idling spring 47c rests on the one hand on the transverse pin 95 and on the other hand on the opposite edge of the aperture 93. The transverse pin 95 limits the push-out travel of the intermediate element 45c from the spring pot 25c. In order to limit the push-in travel of the intermediate element 45c, stop faces 97, 99 are provided on the intermediate element 45c on the one hand and the spring pot 25c on the other hand. The intermediate element 45c has, at its end projecting from the spring pot 25c, a control edge 49c which, in the rest position of the torsional shock absorber, rests substantially without play in the peripheral direction on the control edge of the arm (27 in FIG. 2) of the output part. The contour of the control edge 49c is identical to the contour of the prism faces 35c, 39c of the spring pot 25c adjoining it axially on both sides and, when the stop faces 97, 99 rest on one another, the control edge 49c passes in a flush manner into the prism faces 35c, 39c. With this embodiment also, the load springs are supported in a pretensioned manner via their prism faces 35c, 39c on the control elements (31 in FIG. 2) and the pretensioning force is preferably calculated to be equal to the maximum force acting on the idling spring 47c. As the intermediate elements 45c including the idling springs 47c are arranged directly in the spring pots 25c, the arms of the output part are loaded directly. The operability of the idling suspension can also be checked prior to incorporation of the spring pot 25c.

Figure 11:
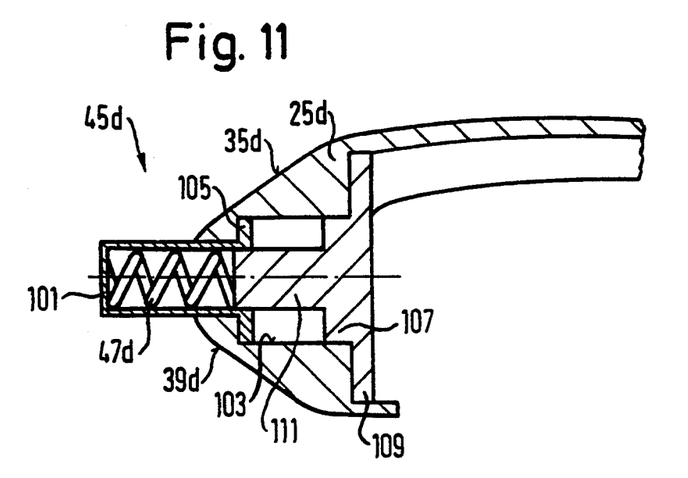
FIGS. 11 and 12 are sectional views of variations of the idling spring arrangement integrated into a spring pot.

FIG. 11 shows a variation of the intermediate element described with reference to FIGS. 9 and 10. The intermediate element 45d comprises a rotationally symmetrical, in particular cylindrical sheet metal tube 101 which is displaceably inserted in a staged hole 103 in the spring pot 25d in the peripheral direction of the torsional shock absorber. A flange 105 limits the push-out travel of the sheet metal tube 101 receiving the idling spring 47d in its interior. The staged hole 103 is sealed from the load spring (23 in FIG. 2) by a spring support 107 which is supported on the spring pot 25d to the side of the staged hole 103 by a plate 109 and extends with a peg 111 into the sheet metal tube 101. The idling spring 47d rests on the one hand on the peg 111 and on the other hand on an end wall of the sheet metal tube 101. In the completely pushed-out position of the sheet metal tube 101, the sheet metal tube 101 rests without play on the control edges of the arms of the output part. During load running, the spring force of the load springs resting on the spring support 107 is transferred directly via the prism faces 35d, 39d onto the control edges of the arms while the sheet metal tube 101 is pushed in completely. As the idling spring 47d is arranged in a cavity in the intermediate element 45d designed as a sheet metal tube 101, the intermediate element can be arranged very compactly in the spring pot 25d.

Figure 12:
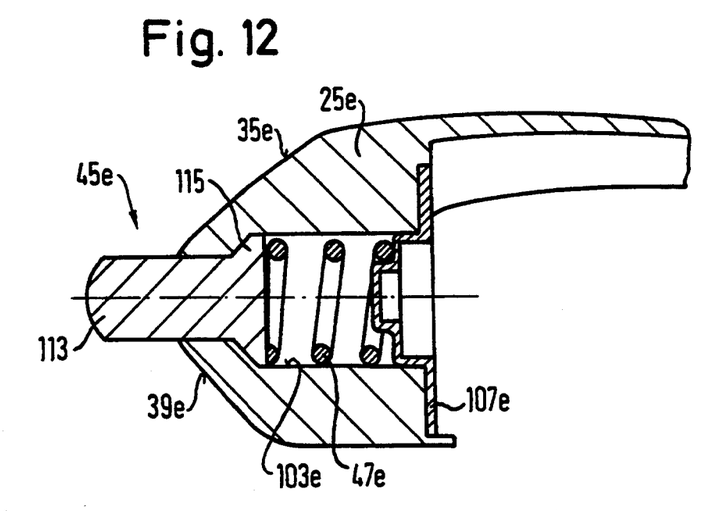

FIG. 12 shows a variation of the intermediate element from FIG. 11. With this intermediate element 45e, a peg 113 which is again rotationally symmetrical is displaceably inserted in the staged hole 103e of the spring pot 25e in the peripheral direction of the torsional shock absorber. At its end located in the staged hole 103e, the peg 113 carries a stop 115 which limits the push-out travel of the peg 113. The idling spring 47e arranged in the enlargement of the staged hole 103 is supported on the one hand on the peg 113 and on the other hand on a substantially plate-shaped spring support 107e which is designed as a deep-drawn sheet metal part, is centred in the manner of the spring support 107 from FIG. 11 on the staged hole 103e or a region of the spring pot 25e adajacent thereto and is held on the spring pot 25e by the load spring (23 in FIG. 2) not shown in detail in FIG. 12. With this variation also, the spring force of the idling spring 47e is transferred directly via the peg 113 during idle running whereas the introduction of force again takes place via the prism faces 35e, 39e of the spring pot 25e onto the arms of the output part during load running. Elsewhere, the variations in FIGS. 11 and 12 correspond to the arrangement according to FIGS. 9 and 10.

The above-described torsional shock absorber with idling suspension is not only suitable for use in a dual-mass flywheel but can also readily be integrated, for example, into a clutch plate of the motor vehicle friction clutch. Here also, the load springs and idling springs can be arranged compactly on a common diameter.

While specific embodiments of the invention have been shown and described in detail to illustrate the application of the inventive principles, it will be understood that the invention may be embodied otherwise without departing from such principles.

What we claim is:

1. A torsional shock absorber for arrangement in a drive train of a motor vehicle, comprising
   first and second damper parts which are rotatable about a common axis of rotation, one of the damper parts also being rotatable about the axis of rotation relative to the other damper part and one of the damper parts being an input part and the other damper part being an output part;
   a substantially annular channel in the first damper part, the channel being concentric to the axis of rotation;
   a plurality of spring means received in the channel and arranged for operation under load in a circumferential direction with respect to the damper parts for elastically coupling the damper parts to each other torsionally, each spring means having two control ends and at least one coil spring between the two control ends, and the damper parts having control edges that are located between the control ends of adjacent spring means in the circumferential direction and are engageable with the control ends of the spring means for torsional load transfer between the damper parts; and
   an intermediate element located between each adjacent pair of spring means, each intermediate element being carried by the second damper part for pivotal movement about a pivot axis extending parallel to and spaced apart radially from the axis of rotation, being resiliently biased by a spring element, and having stop edges which in a relative resting position of the damper parts project circumferentially beyond the control edges of the second damper part and engage the control ends of the adjacent spring means such as to elastically couple the damper parts torsionally, each intermediate element being pivotally displaceable against the bias of the spring element when the control end of one of the adjacent spring means engages a control edge of the second damper part, and each spring element having a spring constant that is sized for no-load operation and is smaller than the spring constant of the spring means.

2. A torsional shock absorber according to claim 1, wherein the second damper part has arms projecting radially between each circumferentially adjacent pair of spring means, the control edges of the second damper part are on circumferentially opposite sides of the arms, and each intermediate element is mounted on one of the arms and includes two covering plates rigidly joined together and arranged on axially opposite sides of the arm, which covering plates, in the relative resting position of the damper parts, project circumferentially beyond the control edges of the arm, and the pivot axis of each intermediate element is located between the spring element and the axis of rotation.

3. A torsional shock absorber according to claim 2, wherein each spring element is held in apertures of the arm and in the two covering plates which are substantially congruent to one another.

4. A torsional shock absorber according to claim 3, wherein the covering plates which are rigidly connected to one another are guided on the arm exclusively by the spring element.

5. A torsional shock absorber according to claim 2, wherein the covering plates are rigidly connected to one another by means of a spacer rivet, the covering plates are in sliding clearance with the arm, and the spacer rivet has a shank portion received in a hole in the arm and forming the pivot axis.

6. A torsional shock absorber according to claim 5, wherein one of the two covering plates of each intermediate element carries, on the side of the aperture facing away from the spacer rivet, an axially projecting nose which is received in a recess in the other of the two covering plates.

7. A torsional shock absorber according to claim 6, wherein the nose has, in the region of a free end, at least one stop edge supported axially on the other of the two covering plates.

8. A torsional shock absorber according to claim 2, wherein the covering plates of each intermediate element, in the resting position, are arranged substantially without clearance in the circumferential direction between the control ends of the adjacent spring means, and the control ends of the spring means are engaged with the control edges of the first damper part with a preload that is substantially equal to the maximum force of the spring elements.

9. A torsional shock absorber according to claim 2, wherein the first damper part has control elements axially on either side of the arms, the control elements of the first damper part forming control edges, the control ends of the spring means are spring pots guiding the coil springs of the spring means at face ends of the coil springs, and wherein the spring pots have prism faces facing circumferentially away from the coil springs including a radially internal prism face and a radially external prism face, the prism faces adjoining one another in a convex end portion that is directed away from the coil spring and the shape of the control edges of the control elements of the first damper part corresponds to the shape of the prism faces.

10. A torsional shock absorber according to claim 9, wherein the spring means are held with initial preload between the control edges of the first damper part via the spring pots in a rest position of the damper parts.

11. A torsional shock absorber according to claim 10, wherein the control edges of the arms of the second damper part also have a shape corresponding to the shape of the prism faces of the spring pots.

12. A torsional shock absorber according to claim 9, wherein the covering plates of each intermediate element engage the radially external prism faces substantially without clearance in the relative resting positions of the damper parts.

13. A torsional shock absorber according to claim 12, wherein the initial preload of the spring means is substantially equal to the maximum loading of the spring elements.

14. A torsional shock absorber according to claim 12, wherein the stop edges of the intermediate elements are shaped such as to produce a nonlinear spring characteristic during idle running.

15. A torsional shock absorber for arrangement in a drive train of a motor vehicle, comprising
first and second damper parts which are rotatable about a common axis of rotation, one of the damper parts also being rotatable about the axis of rotation relative to the other damper part and one of the damper parts being an input part and the other damper part being an output part;
a substantially annular channel in the first damper part, the channel being concentric to the axis of rotation;
a plurality of spring means received in the channel and arranged for operation under load in a circumferential direction with respect to the damper parts for elastically coupling the damper parts to each other torsionally, each spring means having two control ends and at least one coil spring between the two control ends, and the damper parts having control edges that are located between the control ends of adjacent spring means in the circumferential direction and are engageable with the control ends of the spring means for torsional load transfer between the damper parts; and
a plurality of intermediate elements, each of which is carried by the second damper part for movement in a circumferential direction relative to the second damper part, is resiliently coupled by spring elements with the second damper part, and has stop edges which in a relative resting position of the damper parts project circumferentially beyond the control edges of the first damper part and engage the control ends of an adjacent pair of the spring means so that the intermediate elements elastically couple the two damper parts together torsionally by way of the spring elements, each of the intermediate elements, in the relative resting position of the damper parts, being arranged substantially without clearance in the circumferential direction between the control ends of the adjacent spring means, each of the spring elements having a spring constant sized for no-load operation that is smaller than the spring constant of the spring means, and each of the spring means being supported by their two control ends on the control edges of the first damper part with a preload that is substantially equal to the maximum force of the spring elements.

* * * * *